May 23, 1950 V. W. SPEARS 2,508,778
SEQUENCE GROUNDING DEVICE
Filed Oct. 11, 1946 2 Sheets-Sheet 2
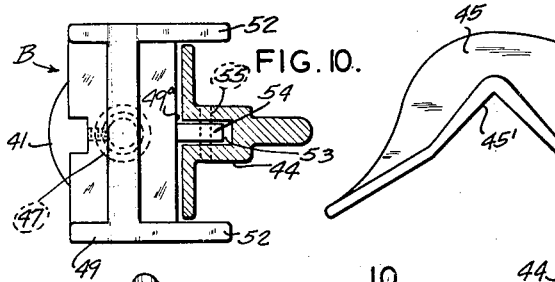
FIG. 10.
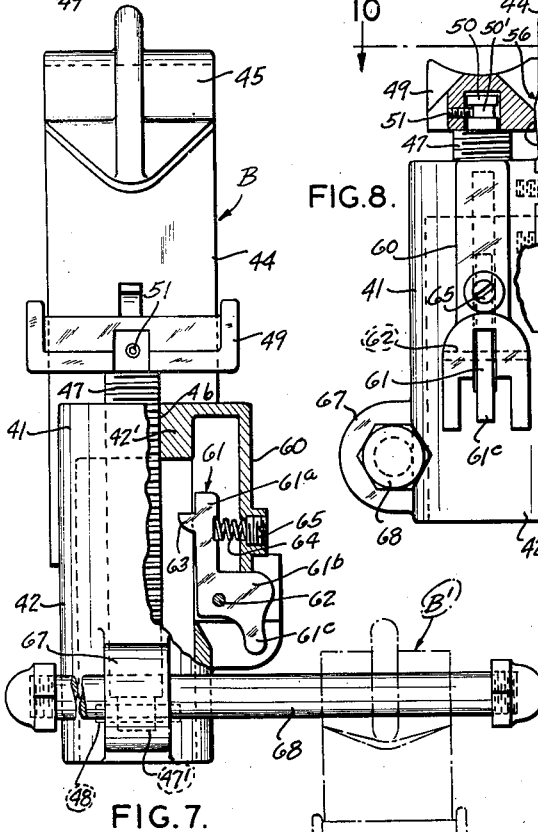
FIG. 8.
FIG. 7.
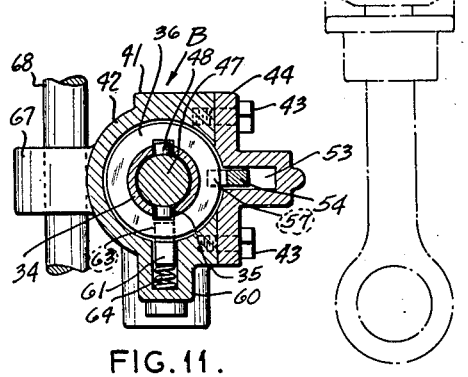
FIG. 11.
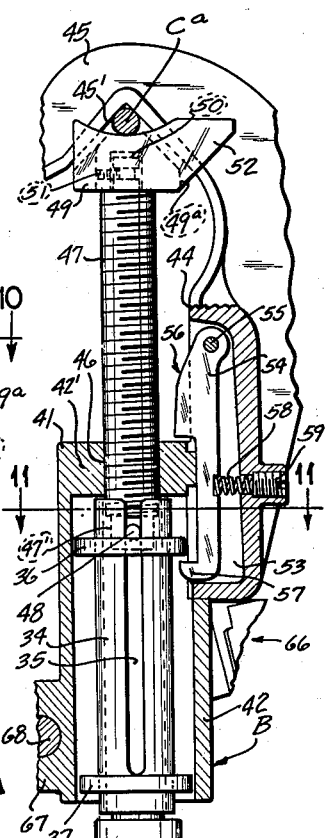
FIG. 9.
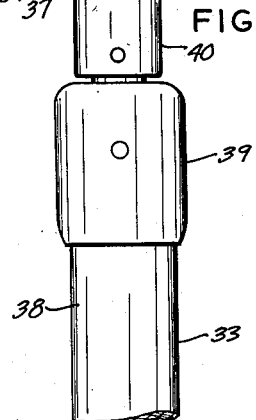
INVENTOR
VERIAN W. SPEARS
By Em Harrington,
ATTORNEY Patented May 23, 1950

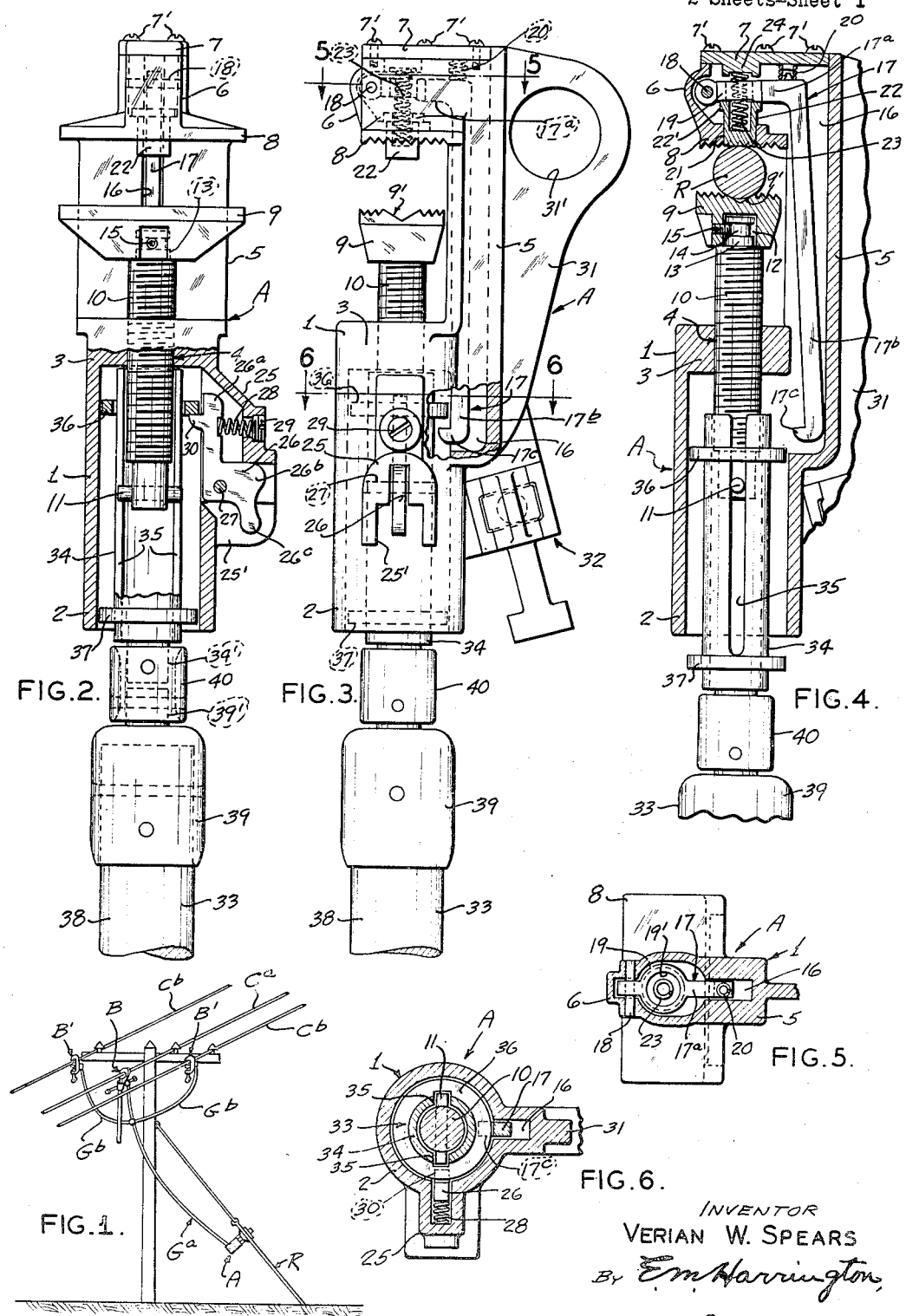

2,508,778

UNITED STATES PATENT OFFICE 2,508,778

SEQUENCE GROUNDING DEVICE

Verian Wright Spears, Columbus, Ind., assignor to James R. Kearney Corporation, St. Louis, Mo., a corporation of Missouri Application October 11, 1946, Serial No. 702,718

16 Claims. (Cl. 173—273)

This invention relates generally to grounding sets of the type adapted particularly for use in grounding overhead, electrical power transmission lines, the predominant object of the invention being to provide a grounding set of this type which, because of the improved construction and arrangement of the clamps which comprise parts of said grounding set, may be arranged for use in association with an electrical conductor, or with electrical conductors, only by following a definite sequence of clamp-applying operations which is required for safe installation of a grounding set in place for use.

Grounding sets of the general type to which the present invention relates comprise one or more line clamps, depending on the number of wires making up the power transmission system with which the grounding set is to be used, and a grounding clamp, the line clamp, or clamps, and the grounding clamp being electrically connected by a ground or by-pass line. In installing such a grounding set for use it is of the utmost importance that the line clamp, or clamps, and the grounding clamp be applied in proper sequence in order to insure the safety of the workman making the installation. In other words, to properly install a grounding set of the general type described above, the grounding clamp must be applied to a grounded element before application of the line clamp, or clamps, to the overhead wire, or wires, of the distribution system, and if this sequence of clamp-applying operations is reversed the death or serious injury of the workman making the installation from electrical shock may be the result of such attempted improper installation of the clamp.

The line clamp and the grounding clamp of the grounding set of the present invention are so constructed and arranged that it is impossible to apply said clamps in improper sequence in grounding an overhead wire of a distribution system, it being necessary, in order to complete the installation of the grounding set, to first apply the grounding clamp to a grounded element, and thereafter apply the line clamp to the overhead wire of a distribution system.

Fig. 1 illustrates a typical installation of the grounding set of the present invention in association with a three wire power distribution system.

Fig. 2 is a view partly in front elevation and partly in vertical section of the grounding clamp of the present invention, a portion of the clamp-applying stick being shown in association with said grounding clamp.

Fig. 3 is a side elevational view of the assembly shown in Fig. 2, a small portion of the grounding clamp in Fig. 3 being shown in section.

Fig. 4 is a vertical section taken through the grounding clamp shown in Figs. 2 and 3, but showing a grounded element clamped by the clamp, a portion of said grounding clamp being broken away in Fig. 4 and the portion of the clamp-applying stick shown therein being illustrated in the process of being withdrawn from the grounding clamp.

Fig. 5 is a horizontal view taken on line 5—5 of Fig. 3.

Fig. 6 is a horizontal section taken on line 6—6 of Fig. 3.

Fig. 7 is a view partly in front elevation and partly in vertical section of a line clamp of the present invention, an auxiliary line clamp, which is shown by dotted lines, being illustrated in association with said line clamp.

Fig. 8 is a view partly in side elevation and partly in vertical section of the line clamp shown in Fig. 7.

Fig. 9 is a fragmentary view largely in vertical section and partially in side elevation of the line clamp shown in Figs. 7 and 8, showing the clamp clamped to a conductor, a portion of the clamp-applying stick being associated with the clamp of Fig. 9.

Fig. 10 is a horizontal section taken on line 10—10 of Fig. 8.

Fig. 11 is a horizontal section taken on line 11—11 of Fig. 9.

In the drawings, wherein are shown for purposes of illustration, merely, one embodiment of the invention, A designates in Figs. 1 to 6, inclusive, the grounding clamp of the invention. The grounding clamp A comprises a clamp body 1 whose lower portion 2 is of tubular formation, there being a horizontal wall 3 at the upper end of said tubular clamp body portion 2 through which is formed a screwthreaded opening 4 (Fig. 4). Extended upwardly from the rear portion of the tubular clamp body portion 2 and formed integral therewith is a clamp body part 5 which is provided with an integral head portion 6 at its upper end which extends forwardly therefrom and overhangs the wall 1 in vertical spaced relation with respect thereto. This head portion is hollow, as is shown in Fig. 4, and is closed at its top by a plate 7 which is removably secured in place by suitable fastening devices 7'. The head portion 6 is provided with a lower, horizontal wall whose bottom face is serrated, as shown in Figs. 3 and 4, and this lower wall provides the grounding clamp A with a fixed jaw 8.

The grounding clamp A includes also a movable jaw 9 which is mounted on a screwthreaded adjusting element 10 that is screwthreadedly extended through the screwthreaded opening 4 formed through the horizontal wall 3, said screwthreaded adjusting element being provided adjacent to its lower end with a pin 11 which extends transversely through said adjusting element and whose opposite end portions project outwardly beyond opposed face portions of said adjusting element 10. The movable jaw 9, whose upper face is serrated and is provided with a seat 9', has formed therein an opening 12 of circular cross-sectional shape, and extended upwardly into this opening is a reduced upper portion 13 of the adjusting element 10. This reduced adjusting element portion 13 has formed therein an annular recess 14 that receives the inner portion of a set screw 15 which is seated in a screwthreaded opening formed in a portion of the jaw 9. Because of this arrangement the adjusting element 10 may rotate relative to the jaw 9, and during such rotation of the adjusting element through the screwthreaded opening 4 of the wall 3 the adjusting element 10 will be adjusted upwardly or downwardly, depending on the direction of rotation of said adjusting element, to move the movable jaw 9 toward or from the fixed jaw 8.

The vertical portion 5 of the clamp body 1 is provided with a vertical extended opening 16 which communicates at its upper end with the hollow interior of the head portion 6 of the clamp body 1 and at its lower end with the interior of the lower portion 2 of said clamp body. The grounding clamp A includes a latching member 17 which is provided with a substantially horizontal upper portion 17a, a substantially vertical portion 17b, and a projected catch 17c at the lower end of said vertical portion 17b, said latching member being disposed largely in the opening 16 in the clamp body portion 5 and in the hollow interior of the head portion 6 of the clamp body. The latching member 17 is supported for pivotal movement by a pivot 18 which extends through the forward portion of the upper horizontal portion 17a of said latching member, and whose opposite end portions are seated in openings formed through opposed wall portions of the head 6 of the clamp body 1. Also, the upper horizontal portion of the latching member 17 is provided with a circular part 19 through which an opening 19' is formed (see Fig. 5), and a coil spring 20 is interposed under compression between the top face of the horizontal, upper portion 17a of the latching member 17 and the bottom face of the top plate 7 of the head 6 of the clamp body, and this coil spring tends to swing the latch 17c at the lower end of said latching member inwardly into the interior of the lower, tubular, clamp body portion 2.

The bottom wall of the head portion 6 of the clamp body 1 which provides the fixed jaw 8 of the grounding clamp A has an opening 21 formed therethrough, and disposed in this opening is a plunger 22. The plunger 22 is provided at its top with an annular flange 22', and said plunger has formed therein an opening which is closed at its lower end by the lower portion of the plunger (see Fig. 4). The plunger 22 is urged downwardly by a coil spring 23 which is interposed between the bottom wall of the opening of said plunger and a spring seat 24 formed on the lower face of the top plate 7 of the head portion 6 of the clamp body, the annular flange 22' of said plunger being adapted to contact with the top face of the fixed jaw 8 to limit downward movement of said plunger in response to force exerted by said coil spring 23. As is shown in Figs. 4 and 5, the coil spring 23 extends through the opening 19' formed through the circular part 19 of the upper, horizontal portion 17a of the latching member 17.

The lower, tubular portion 2 of the clamp body 1 has formed thereon at one side thereof a housing 25, this housing being shaped as is shown in Figs. 2, 3, and 6, and being open at its forward and lower ends as is shown to good advantage at 25' in Fig. 3. The housing 25 houses a secondary latch 26 which is pivotally supported therein by a pivot element 27, and said secondary latch comprises a vertically extended portion 26a, a horizontally extended portion 26b, and a downwardly extended tail portion 26c. The upper portion of the vertical portion 26a of the secondary latch 26 is urged inwardly by a coil spring 28 which is interposed under compression between a spring seat formed on said vertical portion of said secondary latch and a screwthreaded plug 29 which is seated in a screwthreaded opening formed in a portion of the housing 25, the top face of the horizontal portion of the secondary latch contacting with the top wall of the housing opening 25' so as to limit inward movement of said upper portion of said vertical portion of the secondary latch 2 (see Fig. 2). The vertical portion of the secondary latch 26 has formed thereon adjacent to the top thereof an inwardly extended catch 30, which serves a function to be hereinafter explained.

The grounding clamp A has formed on the vertical portion 5 of the body 1 thereof a web 31 which is shaped as is shown in Fig. 3, said web being provided with an opening 31'. Also, the grounding clamp A is provided with a suitable connector structure 32 (Fig. 3) which serves to mechanically and electrically connect a grounding conductor to the clamp.

The grounding clamp A is adapted to be operated by an operating stick 33 which comprises a head portion 34 of tubular formation, said head portion having opposed slots 35 formed vertically in the wall of said tubular head portion which are open at the top edge of said head portion and are closed at their lower ends. The tubular head portion of the operating stick 33 has fixed thereto adjacent to the upper end thereof a collar 36 which projects outwardly from the outer surface of said head portion, and, also, said head portion 34 is provided adjacent to its lower end with a similar collar 37. The operating stick 33 includes an elongated handle element 38, which is formed of wood or other good electrical insulating material, and this handle element is provided with a ferrule 39, fixed at its upper end, which includes a shank 39' that extends upwardly from the top wall of said ferrule (Fig. 2). Also, the head portion 34 of the operating stick is provided with a downwardly extended shank 34' which is similar to the shank 39' of the ferrule 39, and these shanks 34' and 39' are secured together by a sleeve coupler 40 so as to secure the head portion of the operating stick to the handle element 38 thereof.

In applying the grounding clamp A to a grounded element, for instance, the guy rod R shown in Fig. 1, the operating stick 33 is first applied to the grounding clamp by inserting the head portion 34 of said operating stick upwardly into the lower, tubular portion of the clamp body of said grounding clamp, the extended end portions of the pin 11 associated with the adjusting element 10 of the clamp moving through the slots 35 of the head portion of the operating stick. At the time of such introduction of the head portion of the operating stick into the body portion of the clamp, the latching member 17 and the secondary latch 26 are, respectively, in the positions in which they are shown in Figs. 2 and 3. As a result of this situation the upper collar 36 on the inwardly moving head portion of the operating stick will contact the curved faces of the catches 17c and 30 of the latching member 17 and the secondary latch 26 so as to cam said catches rearwardly and permit said collar 36 to pass above catches. Thus, the operating stick is locked within the clamp body and may not be removed until the clamp-applying operation is completed, as will be explained below.

The next step in the operation of applying the grounding clamp to a grounded element is to rotate the adjusting element 10 in the proper direction with the aid of the operating stick 33 as to move the movable jaw 9 away from the fixed jaw 8 a proper distance to permit the clamp to be passed on the grounded element which, when the clamp has been passed thereon, is interposed between the movable jaw 9 and the plunger 22, said plunger being forced to its projected position, as is shown in Fig. 3, by the coil spring 23. The adjusting element 10 is then rotated with the aid of the operating stick 33 in the proper direction to move the movable jaw 9 toward the fixed jaw 8, and as such movement of the movable jaw continues the plunger 22 will be moved inwardly of the hollow interior of the head portion 6 of the clamp body 1 to cause its inner end to contact with the circular portion of the latching member 17, whereupon the inwardly moving plunger will subject the latching arm to such pivotal movement that the catch 17c of said latching member will be moved rearwardly out of the path of the collar 36 of the head of the operating stick. At this time the grounded element is securely gripped by the jaws 8 and 9 of the clamp, and by depressing the tail portion 26c of the secondary latch 26 to move the catch 30 of said secondary latch rearwardly the operating stick may be removed from the clamp.

The grounding set of the present invention includes a line clamp B, and if desired a plurality of secondary line clamp B' as shown in Fig. 1 where the grounding set is installed with respect to a three-wire, power distribution system. The line clamp B comprises a clamp body 41 which includes a lower, tubular portion 42, the hollow interior of said lower, tubular portion being closed at its top by a solid wall portion 42' of the clamp body (see Fig. 9). The lower, tubular portion of the clamp body 41 has secured thereto by suitable fastening devices 43 (Fig. 11) an upstanding clamp body portion 44 which is shaped at its upper end to provide the line clamp B with a fixed jaw 45 of the so-called duck bill type, said fixed jaw being provided with an inverted V-shaped wire seat 45'.

Formed vertically through the solid wall 42' at the top of the lower, tubular clamp body portion 42 is a screwthreaded opening 46 (Fig. 9) through which a screwthreaded adjusting element 47 is extended for axial screwthreaded adjustment, said adjusting element being provided with a lower portion 47' of decreased diameter. This reduced lower portion 47' of the adjusting element 47 supports a transversely extended pin 48 which is disposed in an opening formed through said reduced lower portion of the adjusting element and whose opposite end portions extend outwardly beyond opposed surface portions of said reduced, lower, adjusting element portion.

At the upper end of the adjusting element 47 a movable jaw 49 is mounted thereon, said jaw having an opening of circular cross-section formed therein which is open at the lower face of the movable jaw, and a reduced upper end portion 50 of the adjusting element 47 being extended upwardly into said opening. As is shown in Fig. 8, the upper reduced portion 50 of the adjusting element 47 has formed therein an annular groove 50' into which the inner end portion of a set screw 51 extends, this set screw being seated in a screwthreaded opening formed in a portion of the movable jaw 49. Because of this arrangement the adjusting element may rotate relative to the movable jaw 49 and said movable jaw will be adjusted vertically with said adjusting element. It is to be noted that the movable jaw is so shaped that it is provided with a concave wire seat at its top, and, also, rearwardly extended opposed portions 52 of the movable jaw are disposed outwardly of the opposed side edges of the clamp body portion 44 so as to cause said movable jaw to be guided for straight-line movement during vertical adjustment thereof.

The upstanding clamp body portion 44 has formed therein a narrow, vertically extended opening 53 in which is disposed a latching member 54. This latching member is supported for pivotal movement by a pivot element 55 which extends through the upper portion of said latching member and is seated in portions of the clamp body portion at opposite sides of the opening 53. The latching member 54 is provided with an upper portion of increased width which has formed at an edge thereof a cam face 56 which is shaped as shown to good advantage in Figs. 8 and 9, and said latching member is provided at its lower end with a catch 57. Also, the lower portion of the latching member 54 is urged forwardly of the clamp body 41 by a coil spring 58 which is interposed under compression between a spring seat formed on said latching member and a screwthreaded plug 59 which is seated in a screwthreaded opening formed in a portion of the clamp body 41, the catch 57 of said latching member being extended into the hollow interior of the lower, tubular, clamp body portion 42 when the lower portion of said latching member is forced forwardly by the coil spring 58, as is shown in Fig. 9.

The lower, tubular, clamp body portion 42 has formed thereon a housing 60 which houses a secondary latch 61, said latch 61 being supported for pivotal movement within said housing 60 by a pivot element 62. The latch 61 includes a vertical portion 61a, a horizontal portion 61b, and a downwardly extended tail portion 61c, said vertical portion 61a having formed thereon a catch 63 (Fig. 7) which is normally extended into the hollow interior of the lower, tubular, clamp body portion 42. The upper portion of the part 61a of the latch 61 is urged inwardly by a coil spring 64 which is interposed under compression between a spring seat formed on the latch part 61a and a screwthreaded plug 65 that is seated in a screwthreaded opening formed in a portion of the housing 60, said coil spring maintaining the catch in its position where it is extended into the interior of the lower, tubular, clamp body portion 41.

The clamp body of the line clamp B is provided with a suitable connector assembly 66 which serves to connect a grounding wire to said line clamp. Also, the lower, tubular, body portion 42 of the clamp B is provided with an outstanding lug 67 which rigidly supports a bar 68, said bar being extended in opposite directions from the lug 68 and the extended portions thereof being adapted to support the auxiliary line clamps B' shown in Fig. 1 when the grounding set is not in use, or when said grounding set is being employed for grounding a single overhead conductor.

In applying the line clamp B to an overhead conductor, for instance, the conductor Ca in Fig. 1, the operating stick 33, heretofore described herein, is first applied to the line clamp B by inserting the head portion 34 of said operating stick upwardly into the lower, tubular, clamp body portion 42 of said line clamp, the extended end portions of the pin 48 associated with the adjusting element 47 of the clamp moving through the slots 35 of said head portion of said operating stick. At the time of such introduction of the operating stick into the body portion of the line clamp, the secondary latch 61 is in the position in which it is shown in Fig. 7. As a result of this situation the upper collar 36 on the inwardly moving head portion of the operating stick will contact the curved face on the catch 63 of the latch 61 so as to cam said catch rearwardly and permit said upper collar 36 to pass above the catch whereby the operating stick is locked to the clamp B.

The next step in the operation of applying the line clamp B to an overhead conductor is to rotate the adjusting element 47 in the proper direction with the aid of the operating stick so as to move the movable jaw 49 a sufficient distance from the fixed jaw 45 to permit the line clamp to be passed on the overhead conductor. The line clamp is then elevated with the aid of the operating stick and said clamp is passed on the overhead conductor, the adjusting element 47 then being rotated with the aid of the operating stick to move the movable jaw 49 toward the fixed jaw so as to clamp the overhead conductor between said movable jaw and said fixed jaw, as is shown in Fig. 9.

It is important to note that when the movable jaw 49 moves toward the fixed jaw 45 the latching member 54 swings to a position where its catch 57 is disposed beneath the upper collar 36 of the operating stick 33, and when the line clamp B has been clamped to the overhead conductor, as described above and as shown in Fig. 9, the operating stick remains locked to the clamp, as if any attempt were made to withdraw the head portion 34 of the operating stick 33 the upper collar 36 of said operating stick would abut against the catch 57 of the latching member 54 so as to prevent withdrawal of the head portion of the operating stick from within the hollow interior of the lower, tubular, clamp body portion 42. The only way in which the operating stick may be detached from the line clamp B is to adjust the movable jaw 49 downwardly relative to the fixed jaw 45 until the face portion 49a of said movable jaw contacts with the cam face 56 of the latching member 54 and cams the lower portion of said latching member, and the catch 57 thereof, rearwardly. This will remove said catch of said latching member out of the path of downward movement of the upper collar 36 of the head of the operating stick, as is shown in Fig. 8, and the operating stick may then be detached from the line clamp by additionally depressing the tail portion 61c of the secondary latch 61 to move the catch 63 of said secondary latch out of the path of downward movement of said upper collar 36 of the operating stick.

The complete grounding set includes a grounding wire Ga which connects the line clamp B to the grounding clamp A, and grounding wires Gb which connect the auxiliary line clamps B' to said line clamp B (see Fig. 1), and to properly install the grounding set in association with a power distribution system, such as that shown in Fig. 1, the grounding clamp A is first applied to the grounded element R. It will be remembered that the operating stick 33 is locked to the grounding clamp A until the said grounding clamp is securely clamped to the grounded element, whereupon the operating stick may be detached from the grounding clamp A for use in applying the line clamp B to the overhead conductor Ca. With the grounding clamp properly secured to the grounded element and the operating stick released therefrom, said operating stick is applied to the line clamp B, as has been previously explained herein, and said line clamp is elevated to the overhead conductor Ca and is passed onto and is clamped to said overhead conductor, the operating stick being locked to the line clamp B during the time said line clamp is clamped to the overhead conductor. The auxiliary line clamps B' are then removed from the bar 68 of the line clamp B with the aid of an ordinary clamp stick, if the power distribution system with which the grounding set is being installed is a three-wire system as is shown in Fig. 1, and said auxiliary line clamps are applied to the wires Cb of said distribution system to complete the installation of the grounding set.

It is plain therefore that the clamps of the improved grounding set of the present invention must be applied in proper sequence involving application of the grounding clamp first and subsequent application of the line clamp, or line clamps. This follows from the fact that if the line clamp B is incorrectly applied first the operating stick is locked to said line clamp and would not be available for use in applying the grounding clamp. Also, when the grounding clamp is applied first it must be properly and completely clamped to the grounded element because until this is accomplished the operating stick is locked to said grounding clamp. Finally, in removing the grounding set the line clamp B must be removed from the overhead conductor first because the operating stick is locked to said line clamp and hence is not available for improperly removing the grounding clamp first. The hand-operated secondary latches 26 and 61 of the grounding clamp A and the line clamp B serve no function in preventing improper application or removal of the clamps of the grounding set, their function being to retain the operating stick in operative relation with respect to one or the other of the clamps after the latching members 17 or 54 of a clamp has been operated to a position where it no longer locks the operating stick to the clamp.

I claim:

1. A grounding set comprising a grounding clamp which includes a fixed jaw and a movable jaw, a line clamp which includes a fixed jaw and a movable jaw, a grounding conductor electrically connecting said grounding clamp and said line clamp, an operating stick common to said grounding clamp and said line clamp for actuating said grounding clamp and said line clamp, latching means forming part of said line clamp for automatically locking said operating stick in engagement with respect to said line clamp when the movable jaw of said line clamp is in clamping engagement relative to an electrical conductor and movable by said movable jaw of said line clamp to release said operating stick from engagement with respect to said line clamp on actuation of said movable jaw of said line clamp out of the conductor engaging position, and latching means forming part of said grounding clamp for automatically locking said operating stick in engagement with respect to said grounding clamp until said grounding clamp has been clamped to a grounded element and movable in response to clamping engagement of said movable jaw of said grounding clamp with a grounded element to release said operating stick from engagement with respect to said grounding element.

2. A clamp comprising a clamp body, a fixed jaw, a movable jaw, adjusting means for adjusting said movable jaw toward and from said fixed jaw, an operating member for actuating said adjusting means, and latching means supported by said clamp body for locking said operating member in engagement with respect to said clamp and actuated in response to movement of said movable jaw with respect to said fixed jaw to release said operating member from engagement with respect to said clamp.

3. A clamp comprising a clamp body, a fixed jaw, a movable jaw, adjusting means for adjusting said movable jaw toward and from said fixed jaw, an operating member for actuating said adjusting means, and pivotally supported latching means supported by said clamp body for locking said operating member in engagement with respect to said clamp and actuated in response to movement of said movable jaw with respect to said fixed jaw to release said operating member from engagement with respect to said clamp.

4. A clamp comprising a clamp body, a fixed jaw, a movable jaw, adjusting means for adjusting said movable jaw toward and from said fixed jaw, an operating member for actuating said adjusting means, and pivotally supported latching means supported by said clamp body for locking said operating member in engagement with respect to said clamp and actuated in response to movement of said movable jaw with respect to said fixed jaw to release said operating member from engagement with respect to said clamp, said latching means being provided with a catch portion which in the latching position of the latching means is adapted to engage a portion of said operating member to prevent disengagement thereof from the clamp.

5. A clamp comprising a clamp body, a fixed jaw, a movable jaw, adjusting means for adjusting said movable jaw toward and from said fixed jaw, an operating member for actuating said adjusting means, and pivotally supported latching means supported by said clamp body for locking said operating member in engagement with respect to said clamp and actuated in response to movement of said movable jaw with respect to said fixed jaw to release said operating member from engagement with respect to said clamp, said latching means being provided with a catch portion which in the latching position of the latching means is adapted to engage a portion of said operating member to prevent disengagement thereof from the clamp, and said catch portion having a cam face which said portion of the operating member engages for displacing the latching means when the operating member is being engaged with the clamp.

6. A clamp comprising a clamp body, a fixed jaw, a movable jaw, adjusting means for adjusting said movable jaw toward and from said fixed jaw, an operating member for actuating said adjusting means, pivotally supported latching means supported by said clamp body for locking said operating member in operative engagement with respect to said clamp and actuated in response to movement of said movable jaw with respect to said fixed jaw to release said operating member from engagement with respect to said clamp, and spring means for urging said latching means toward the latching position.

7. A line clamp for a grounding set comprising a clamp body, a fixed jaw, a movable jaw, adjusting means for adjusting said movable jaw toward said fixed jaw to clamp an electrical conductor therebetween and for retracting said movable jaw from said fixed jaw to release the clamp from an electrical conductor, an operating member for actuating said adjusting means, and latching means for locking said operating member in engagement with respect to said clamp when said movable jaw is in conductor clamping relation with respect to said fixed jaw, a portion of said movable jaw being movable into contact with a portion of said latching means when said movable jaw is retracted with respect to said fixed jaw to actuate said latching means and release said operating member from engagement with respect to the clamp.

8. A line clamp for grounding set comprising a clamp body, a fixed jaw, a movable jaw, adjusting means for adjusting said movable jaw toward said fixed jaw to clamp an electrical conductor therebetween and for retracting said movable jaw from said fixed jaw to release the clamp from an electrical conductor, an operating member for actuating said adjusting means, and pivotally supported latching means for locking said operating member in engagement with respect to said clamp when said movable jaw is in conductor clamping relation with respect to said fixed jaw, a portion of said movable jaw being movable into contact with a portion of said latching means when said movable jaw is retracted with respect to said fixed jaw to actuate said latching means and release said operating member from engagement with respect to the clamp.

9. A line clamp for a grounding set comprising a clamp body, a fixed jaw, a movable jaw, adjusting means for adjusting said movable jaw toward said fixed jaw to clamp an electrical conductor therebetween and for retracting said movable jaw from said fixed jaw to release the clamp from an electrical conductor, an operating member for actuating said adjusting means, pivotally supported latching means for locking said operating member in engagement with respect to said clamp when said movable jaw is in conductor clamping relation with respect to said fixed jaw, a portion of said movable jaw being movable into contact with a portion of said latching means when said movable jaw is retracted with respect to said fixed jaw to actuate said latching means and release said operating member from engagement with respect to the clamp, and spring means for urging said latching means toward the latching position.

10. A line clamp for a grounding set comprising a clamp body, a fixed jaw, a movable jaw, adjusting means for adjusting said movable jaw toward said fixed jaw to clamp an electrical conductor therebetween and for retracting said movable jaw from said fixed jaw to release the clamp from an electrical conductor, an operating member for actuating said adjusting means, pivotally supported latching means for locking said operating member in engagement with respect to said clamp when said movable jaw is in conductor clamping relation with respect to said fixed jaw, a portion of said movable jaw being movable into contact with a portion of said latching means when said movable jaw is retracted with respect to said fixed jaw to actuate said latching means and release said operating member from engagement with respect to the clamp, and spring means for urging said latching means toward the latching position, said latching means being provided with a catch portion which is adapted to engage a portion of said operating member when the latching means is in the latching position to prevent disengagement of said operating member from the clamp.

11. A line clamp for a grounding set comprising a clamp body, a fixed jaw, a movable jaw, adjusting means for adjusting said movable jaw toward said fixed jaw to clamp a grounded element therebetween and for retracting said movable jaw from said fixed jaw to release the clamp from a grounded element, an operating member for actuating said adjusting means, latching means for locking said operating member in engagement with respect to said clamp when said movable jaw is in conductor clamping relation with respect to said fixed jaw, a portion of said movable jaw being movable into contact with a portion of said latching means when said movable jaw is retracted with respect to said fixed jaw to actuate said latching means and release said operating member from engagement with respect to the clamp, and a manually releasable secondary latching means for additionally locking said operating member in engagement with respect to the clamp.

12. A grounding clamp for a grounding set comprising a clamp body, a fixed jaw, a movable jaw, adjusting means for adjusting said movable jaw toward said fixed jaw to clamp a grounded element therebetween and for retracting said movable jaw from said fixed jaw to release the clamp from a grounded element, an operating member for actuating said adjusting means, and latching means for locking said operating member in engagement with respect to said clamp when said movable jaw is retracted with respect to said fixed jaw, said latching means comprising an elongated latching element having a catch portion which is adapted to engage a portion of said operating member when said elongated latching element is in the latching position so as to prevent disengagement of the operating member from the clamp, and a plunger supported by said fixed jaw for movement, said plunger being moved as the movable jaw of the clamp approaches its clamping position with respect to the fixed jaw of the clamp in contact with a portion of said elongated latching element whereby said elongated latching element is subjected to movement which retracts the catch portion thereof so as to release the operating member from the clamp.

13. A grounding clamp for a grounding set comprising a clamp body, a fixed jaw, a movable jaw, adjusting means for adjusting said movable jaw toward said fixed jaw to clamp a grounded element therebetween and for retracting said movable jaw from said fixed jaw to release the clamp from a grounded element, an operating member for actuating said adjusting means, and latching means for locking said operating member in engagement with respect to said clamp when said movable jaw is retracted with respect to said fixed jaw, said latching means comprising an elongated pivotally supported latching element having a catch portion which is adapted to engage a portion of said operating member when said elongated latching element is in the latching position so as to prevent disengagement of the operating member from the clamp, and a plunger supported by said fixed jaw for movement, said plunger being moved as the movable jaw of the clamp approaches its clamping position with respect to the fixed jaw of the clamp in contact with a portion of said elongated latching element whereby said elongated latching element is subjected to pivotal movement which retracts the catch portion thereof so as to release the operating member from the clamp.

14. A grounding clamp for a grounding set comprising a clamp body, a fixed jaw, a movable jaw, adjusting means for adjusting said movable jaw toward said fixed jaw to clamp a grounded element therebetween and for retracting said movable jaw from said fixed jaw to release the clamp from a grounded element, an operating member for actuating said adjusting means, and latching means for locking said operating member in engagement with respect to said clamp when said movable jaw is retracted with respect to said fixed jaw, said latching means comprising an elongated pivotally supported latching element having a catch portion which is adapted to engage a portion of said operating member when said elongated latching element is in the latching position so as to prevent disengagement of the operating member from the clamp, spring means for urging said elongated latching element toward the latching position, and a plunger supported by said fixed jaw for movement, said plunger being moved as the movable jaw of the clamp approaches its clamping position with respect to the fixed jaw of the clamp in contact with a portion of said elongated latching element whereby said elongated latching element is subjected to pivotal movement which retracts the catch portion thereof so as to release the operating member from the clamp.

15. A grounding clamp for a grounding set comprising a clamp body, a fixed jaw, a movable jaw, adjusting means for adjusting said movable jaw toward said fixed jaw to clamp a grounded element therebetween and for retracting said movable jaw from said fixed jaw to release the clamp from a grounded element, an operating member for actuating said adjusting means, and latching means for locking said operating member in engagement with respect to said clamp when said movable jaw is retracted with respect to said fixed jaw, said latching means comprising an elongated pivotally supported latching element having a catch portion which is adapted to engage a portion of said operating member when said elongated latching element is in the latching position so as to prevent disengagement of the operating member from the clamp, spring means for urging said elongated latching element toward the latching position, a plunger supported by said fixed jaw for movement, said plunger being moved as the movable jaw of the clamp approaches its clamping position with respect to the fixed jaw of the clamp in contact with a portion of said elongated latching element whereby said elongated latching element is subjected to pivotal movement which retracts the catch portion thereof so as to release the operating member from the clamp, and springs means for subjecting said plunger to movement in one direction relative to said fixed jaw.

16. A grounding clamp for a grounding set comprising a clamp body, a fixed jaw, a movable jaw, adjusting means for adjusting said movable jaw toward said fixed jaw to clamp a grounded element therebetween and for retracting said movable jaw from said fixed jaw to release the clamp from a grounded element, an operating member for actuating said adjusting means, and latching means for locking said operating member in engagement with respect to said clamp when said movable jaw is retracted with respect to said fixed jaw, said latching means comprising an elongated latching element having a catch portion which is adapted to engage a portion of said operating member when said elongated latching element is in the latching position so as to prevent disengagement of the operating member from the clamp, a plunger supported by said fixed jaw for movement, said plunger being moved as the movable jaw of the clamp approaches its clamping position with respect to the fixed jaw of the clamp in contact with a portion of said elongated latching element whereby said elongated latching element is subjected to movement which retracts the catch portion thereof so as to release the operating member from the clamp, and a manually releasable secondary latching means for additionally locking said operating member in engagement with respect to the clamp.

VERIAN WRIGHT SPEARS.

REFERENCES CITED

The following references are of record in the file of this patent:

UNITED STATES PATENTS

| Number | Name | Date |
|---|---|---|
| 2,235,274 | Trehern | Mar. 18, 1941 |